2,913,437

LOW MOLECULAR WEIGHT OLEFIN/MALEIC ANHYDRIDE COPOLYMERS MADE IN SPECIAL SOLVENT SYSTEMS

John H. Johnson, Dayton, Ohio, assignor to Monsanto Chemical Company, St. Louis, Mo., a corporation of Delaware No Drawing. Application August 10, 1956
Serial No. 603,212

17 Claims. (Cl. 260—78.5)

This invention relates to the production of low molecular weight olefin/maleic anhydride copolymers. In some of its aspects the invention pertains to the copolymerization of maleic anhydride with ethylene and/or propylene and/or butene in the presence of particular materials which result in the production of low molecular weight copolymers, particularly ethylene/maleic anhydride copolymers having a specific viscosity not in excess of 0.2 as determined on a solution of one weight percent of the copolymer in dimenthylformamide at 25° C.

Copolymers of maleic anhydride with all sorts of copolymerizable unsaturated organic compounds have been known for many years. It is known to copolymerize maleic anhydride with the lower olefin hydrocarbons, the resulting copolymers containing substantially equimolar proportions of maleic anhydride and the olefin combined therein. The copolymerization is advantageously effected by subjecting a solution of maleic anhydride in an organic diluent, e.g., benzene, to a superatmospheric olefin pressure, employing a peroxide catalyst and elevated temperatures. In many instances where a comparatively high molecular weight copolymer is desired, this procedure is adequate. However, it has been found difficult to produce low molecular weight olefin/maleic anhydride copolymers, which find various uses such as deflocculants and thinners for drilling muds and dispersants for pigments. While especially elevated temperatures, e.g., those above 100° C., tend to result in a product of lowered molecular weight, the physical form is not desirable; it appears that the high temperatures cause a softening of the copolymer product which forms as a more or less insoluble solid in suspension in the diluent or solvent used, and the softened particles of polymer tend to agglomerate, as well as accumulate on the walls of the reaction vessel and stirrer, if any is used. While for many polymerizations an increase in the amount of catalyst causes a decrease in molecular weight of the polymer, this particular system is not very sensitive to catalyst concentration at least insofar as reflected in a change in molecular weight.

In accordance with the present invention in preferred aspects, the copolymerization of maleic anhydride with a $C_2$ to $C_4$ olefin is effected in the presence of an inert liquid solvent for maleic anhydride selected from the group consisting of benzene, halobenzenes, and haloparaffins, plus an alkylated aromatic hydrocarbon having at least one α-hydrogen. By α-hydrogen is meant a hydrogen atom on an α-carbon atom; by α-carbon atom is meant one attached directly to a carbon atom that forms part of an aromatic, e.g., benzene ring.

The inert liquid used, namely benzene, a halobenzene or a haloparaffin, is an excellent solvent for maleic anhydride and is employed in amounts adequate to maintain all the maleic anhydride charged to the process in solution in the reactiton mixture at the reaction conditions. Preferably said inert liquid is capable of dissolving at least 10 weight percent maleic anhydride at 60° C. Among the halobenzenes and haloparaffins, the chloro- and bromo-compounds are preferred, although the fluoro- and iodo-compounds are also operable. Especially preferred are the mono- and dihalobenzenes, and the mono-, di-, tri- and tetra-haloparaffins having from 2 to 5 carbon atoms, and especially having not more than two halogen atoms, on any one carbon atom. These liquids are employed as solvents for the maleic anhydride, but they are essentially inert, i.e., they do not react with the maleic anhydride or the olefin hydrocarbon, and those such as ethylene dichloride, that lower the molecular weight of the olefin/maleic anhydride copolymer product do so only to a limited extent.

In contrast, the alkylated aromatic hydrocarbons having at least one α-hydrogen atom profoundly lower the molecular weight of the copolymer product. However, these alkylated aromatic hydrocarbons are poor solvents for maleic anhydride, and generally the more effective they are for lowering the molecular weight of the copolymer product, the less effective they are as solvents for maleic anhydride. Use of the alkylated aromatic hydrocarbons alone, i.e., in the absence of the inert liquid solvents for maleic anhydride mentioned (benzene, halobenzenes and haloparaffins), results in copolymer product of poor physical form, possibly due to their poor solvent capacity for maleic anhydride. Thus, it is only by combining an inert liquid which is a good solvent for maleic anhydride, namely benzene, a halobenzene or a haloparaffin, with an alkylated aromatic hydrocarbon having at least one α-hydrogen atom and which is a poor solvent for maleic anhydride, that I am able to obtain the desired result of producing an olefin/maleic anhydride copolymer of very low molecular weight yet having suitable physical form.

The alkylated aromatic hydrocarbons having at least one α-hydrogen employed in the present invention, in conjunction with the stated inert solvents for maleic anhydride, permit the production of ethylene/maleic anhydride copolymers, propylene/maleic anhydride copolymers, and butene/maleic anhydride copolymers having low molecular weights desired for certain purposes, and have marked advantages over certain other types of compounds which also result in the production of low molecular weight copolymers in that although the yield is reduced at a given concentration of catalyst, usually a peroxide, only modest increases in concentration of the catalyst are required to obtain yields as high as would otherwise be obtainable in the absence of the said alkylated aromatic hydrocarbon.

Among the compounds selected from the group consisting of benzene, halobenzenes, and haloparaffins, only those which are normally liquid, i.e., liquid at ordinary room temperature, say 20° C., or at least which are liquid at the temperature and pressure conditions employed for the copolymerization, are contemplated; from the viewpoint of convenience those which are normally liquid are much preferred. Similarly, of the alkylated aromatic hydrocarbons having at least one α-hydrogen, those which are normally liquid, i.e., liquid at ordinary room temperature, say 20° C., or at least which are liquid at the temperature and pressure conditions employed for the copolymerization, are most convenient to use. In any event the alkylated aromatic hydrocarbon having at least one α-hydrogen atom chosen should be soluble in the reaction mixture, which of course includes the afore-discussed inert liquid solvent for maleic anhydride and which contains dissolved therein maleic anhydride and olefin monomer and catalyst, to an extent sufficient to result in the desired lowering of the molecular weight of the copolymer product. Alkylated aromatic hydrocarbons (having at least one α-hydrogen) containing from 7 to 15 carbon atoms are preferred.

By way of example, but not limitation, of suitable inert liquid solvents for maleic anhydride that can be employed in the practice of the present invention, there are mentioned: benzene, chlorobenzene, o-dichlorobenzene, m-dichlorobenzene, p-dichlorobenzene, bromobenzene, o-dibromobenzene, m-dibromobenzene, p-chlorobromobenzene, fluorobenzene, m-chlorobromobenzene, chloroform, ethylene dichloride (i.e., 1,2-dichloroethane), 1,1-dichloroethane, ethylene dibromide, 1,4-dichlorobutane, n-amyl chloride, isoamyl chloride, tertiary butyl bromide, propylene dichloride.

By way of example, but not limitation, of suitable alkylated aromatic hydrocarbons having at least one α-hydrogen that can be employed in the practice of the present invention, there are mentioned: toluene, ethyl benzene, o-xylene, m-xylene, p-xylene, the various isomeric diethylbenzenes, cumene (i.e., isopropylbenzene), p-cymene (i.e., p-methylisopropylbenzene), o-cymene, m-cymene, diisopropylbenzene (o-, m-, and p- and mixtures thereof), mesitylene, pseudo-cumene (i.e., 1, 2, 4-trimethylbenzene), diphenylmethane, the various isomeric monoisopropylbiphenyls, the diisopropylbiphenyls, the monoamylnaphthalenes, alkylated triphenyls, o-, m-, and p-ethyltoluene, n-butylbenzene, sec.-butylbenzene, isobutylbenzene, o-, m-, and p-ethylcumene, p-tert-butylcumene.

The quantity of the particular alkylated aromatic hydrocarbon employed will fall within a rather wide range. The quantity required to attain a given molecular weight will vary with the particular aromatic hydrocarbon, and in this connection the following principles generally, but not always, apply: those having three hydrogens on an α-carbon atom, i.e., those substituted only with one or more methyl groups, are the least active and hence must be used in largest amounts and amongst these those having two methyl groups are more active than those having one; those having only two hydrogen atoms on an α-carbon are more active and can be used in somewhat smaller amounts; those having only a single α-hydrogen atom on α-carbon are the most active and can be used in the smallest amounts. As indicated, in general the greater the number of alkyl groups (having α-hydrogen) substituted on the aromatic ring, the greater the activity, all other considerations being equal, and hence the smaller the quantity of alkylated aromatic hydrocarbon needed to give a chosen low molecular weight. These general principles will serve as a guide but variations therefrom will be found in individual instances. A preferred range is from 10 to 300 mole percent of the alkylated aromatic hydrocarbon having at least one α-hydrogen, based on the reacting monomers (assuming 100% conversion), i.e., from 10 to 300 moles of the alkylated aromatic hydrocarbon per 50 moles maleic anhydride charged (50 moles maleic anhydride will theoretically react with 50 moles of the olefin thus making 100 moles of "reacting monomers"). The same basis is meant herein when mole percent catalyst is mentioned. For most purposes I prefer to use from 25 to 150 mole percent of the alkylated aromatic hydrocarbon. At otherwise fixed reaction conditions, the higher the percentage of alkylated aromatic hydrocarbon the lower the molecular weight of the resulting copolymer. The amount of alkylated aromatic hydrocarbon used is one of several interdependent reaction variables which affect the molecular weight of the product. The more important of the other such variables are the reaction temperature and the reaction pressure (upon which the hydrocarbon monomer concentration depends). In general, the higher the temperature, the lower the molecular weight, and the higher the pressure, the higher the molecular weight. However, the temperature should not be increased too much for the reasons discussed hereinabove. Also, the pressure should not be lowered too much or the yield of copolymer tends to decrease to an undue extent. Lower pressures are more suitable in the case of propylene and isobutylene copolymers where the vapor pressures of the olefin at a given temperature are lower than in the case of ethylene. I prefer to employ a reaction temperature within the range of 40 to 80° C., and 60 to 70° C. is especially advantageous. At such temperatures, the reaction rate is good and the physical form of the copolymer product is good, especially when yields are kept high. The reaction pressure can be atmospheric or below, but is preferably superatmospheric. It is preferred that the reaction be carried out in a closed vessel such as a stirred autoclave, rocking bomb, tubular reactor through which reaction mixture flows, or the like, at a pressure above atmospheric pressure. The pressure is preferably above 100 pounds per square inch gauge for the preparation of ethylene/maleic anhydride copolymers, and pressures of 150 to 400 pounds per square inch gauge are especially preferred. However, even higher pressures, say up to 1000 pounds per square inch gauge and above, are permissible. As pointed out hereinafter, in general, the higher the pressure, the higher the molecular weight and hence the greater the quantity of alkylated aromatic hydrocarbon required.

The olefin reactant can be a single olefin or a mixture of any two or more of the olefins ethylene, propylene, isobutylene, butene-1, butene-2-cis, and butene-2-trans. Preferred olefins are ethylene, propylene and isobutylene. While the maleic anhydride copolymers of these olefins have many attributes in common, there are also important differences among the products as well as among the optimum ranges of reaction conditions to be employed in making them. Thus reaction pressures can be significantly lower when higher boiling olefin monomers are used. For example, adequate olefin monomer concentration can be obtained at pressures ranging from 50–200 p.s.i. when propylene is involved; with isobutylene, essentially atmospheric pressures are sufficient, but higher pressures can be used. The properties of the copolymers differ markedly with the olefin monomer with particular reference to acid strength of the copolymers which have been hydrolyzed to the free acid form and chemical reactivity of both the anhydride and the acids. In general, the greater the degree of substitution on the ethylene group, the lesser are both acid strengths and chemical reactivity (i.e., ease of esterification, etc.)

The invention will be discussed in more detail referring to ethylene/maleic anhydride copolymers by way of example, and application of same to the other olefins will be apparent, bearing in mind the foregoing comments.

The copolymer product contains essentially one mole of total olefin per one mole of maleic anhydride combined therein, irrespective of the relative proportions of ethylene or other olefin or mixture of olefins on the one hand, and maleic anhydride on the other hand, introduced to the reaction system. The ratio of free olefin, e.g., ethylene, available for reaction, to free maleic anhydride available for reaction, at any given time depends upon a variety of factors, including particularly the quantity of free maleic anhydride dissolved in the liquid reaction mixture and the quantity of ethylene dissolved in the liquid reaction mixture. The latter value in turn depends upon the solubility of ethylene in the liquid reaction mixture, which is a function of the particular solvent for maleic anhydride, the particular alkylated aromatic hydrocarbon, the relative proportions and absolute quantities of same, the temperature, the pressure, and the concentration of maleic anhydride in the total liquids. It is much preferred that by the time the reaction has been completed, an excess of ethylene over that required to react with the entire quantity of maleic anhydride shall have been furnished to the reaction mixture, so as to give maximum utilization of the maleic anhydride. (This is less necessary with propylene and isobutylene, and with these olefins, especially the latter, an effective manner of operating is to charge initially all the maleic anhydride and less than the stoichiometric amount of olefin and intermittently or continuously add olefin until the total charged is just equal to or slightly more than the stoichiometric quantity.) Any unreacted ethylene is readily recovered and recycled to the reaction. The ethylene, maleic anhydride, solvent, alkylated aromatic, and catalyst can be brought together in various ways, but in any event thorough intermixture of same should be provided. Thus, the reaction can be conducted in a batch, into which ethylene is continuously or intermittently added to maintain pressure until all the maleic anhydride is used up by copolymerization. A similar operation can be conducted wherein maleic anhydride is added continuously or intermittently. The components of the reaction mixture can be continuously fed into a stirred autoclave with continuous overflow of total reaction mixture out of the autoclave either to recovery steps or through a series of autoclaves. A total reaction mixture can be passed through an elongated reaction tube, with ethylene and/or maleic anhydride and/or catalyst and/or solvent and/or alkylated aromatic being added at one or more points along the length of the tube if desired.

It is preferred to employ an amount of solvent plus alkylated aromatic hydrocarbon such that the final reaction mixture will have a solids content (calculated on the assumption that all maleic anhydride has copolymerized) within the range of 5 to 30 weight percent.

The copolymerization is effected in the presence of a catalyst of free-radical promoting type, principal among which are peroxide-type polymerization catalysts and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR'', wherein R' is an organic radical and R'' is an organic radical or hydrogen. These compounds are broadly termed peroxides, and in a more specific sense are hydroperoxides when R'' is hydrogen. R' and R'' can be hydrocarbon radicals or organic radicals substituted with a great variety of substituents. By way of example, suitable peroxide-type catalysts include: benzoyl peroxide, lauroyl peroxide, tertiary butyl peroxide, 2,4-dichlorobenzoyl peroxide, tertiary butyl hydroperoxide, diacetyl peroxide, diethylperoxycarbonate, dimethylphenylhydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N═N— wherein the indicated valences can be attached to a wide variety of organic radicals, at least one, however, preferably being attached to a tertiary carbon atom. By way of example of suitable azo-type catalysts can be mentioned α-α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy type or azo-type or other free radical promoting type of polymerization catalyst is used in small but catalytic amounts, which generally are not in excess of 1 to 2 mole percent, based on the reacting monomers as above defined. A suitable quantity is often in the range of 0.1 to 1.0 mole percent.

It is an important advantage of the present invention that the alkylated aromatic hydrocarbon having at least one α-hydrogen, while quite active in reducing the molecular weight of the copolymer product, do not seem to stop the chain transfer reaction to a severe extent and hence even with comparatively large amounts of the added alkylated aromatic hydrocarbon, it is necessary to increase the catalyst concentration only a very moderate amount.

The quantity of the alkylated aromatic hydrocarbon employed will be chosen which, in combination with the other reaction variables, will result in the production of an ethylene/maleic anhydride copolymer having a specific viscosity less than that obtained if the said alkylated aromatic hydrocarbon is not used. In general, the specific viscosity should be not in excess of about 0.3, as determined on a one weight percent solution of the copolymer product in dimethylformamide, the viscosity measurement being made at 25° C. The preferred range of specific viscosities for ethylene/maleic anhydride copolymers is from 0.05 to 0.2, and a value of less than 0.15 is preferred for most uses to which the copolymer may be put. Since there are certain inherent viscosity differences depending upon the olefin employed, the preferred range of specific viscosities for the copolymers will vary. This is due to the effects of olefin substitution upon the degree of coiling for the polymer chain which results in varying solution viscosities for different polymers of equivalent molecular weights. Thus, the preferred specific viscosity range for propylene/maleic anhydride copolymer is from 0.10 to 0.4° and for isobutylene/maleic anhydride copolymer from 0.20 to 1.0. To obtain polymers having these specific viscosities, the amount of alkylated aromatic hydrocarbon employed will in most cases be within the range of 25 to 150 mole percent based on reacting monomers as hereinabove defined. Unreacted alkylated aromatic remaining present in the final reaction mixture can be recovered and returned to the process for further use, generally in admixture with the recovered solvent for maleic anhydride.

The commercial form of maleic anhydride is satisfactory for use in the present invention. Where exposure to moisture has occurred and the maleic anhydride is contaminated with maleic acid, it is preferred to dissolve the material in the solvent to be used in the reaction, when the solvent is benzene, and separate by filtration or centrifuging or otherwise any maleic acid present, which is not dissolved by the benzene. However, when one intends to use some of the other solvents for maleic anhydride, such as ethylene dichloride, which are also excellent solvents for maleic acid, other procedures are required for removing any contaminating maleic acid from the maleic anhydride prior to use. In other words a maleic acid-free reaction mixture is preferred, though not required. As pointed out before, the copolymer product generally separates as a solid insoluble in the reaction mixture. It can be separated therefrom by centrifuging or filtration as desired, and then is preferably washed with a hot organic solvent for maleic anhydride, such as benzene at 100° F., sufficiently to remove any unreacted maleic anhydride from the copolymer product. The copolymer is then subjected to conventional drying procedure to remove any residual solvent. As an alternative procedure for isolation, the polymer slurry can be direct dried in a vacuum-pan drier. In any procedure for isolating copolymer product, the bulk of the solvent and alkylated aromatic hydrocarbon are recovered, and of course can be returned for reuse in the copolymerization process.

The low molecular weight olefin/maleic anhydride copolymers produced by the practice of the present invention find particular use as dispersants in numerous industrial fields. They have been found to be outstanding in their ability to thin drilling muds, i.e., aqueous suspensions of clay or other finely divided inorganic solids used in the drilling of oil wells. The low molecular weight copolymers are also dispersants for inorganic pigments, for clay slips used in the ceramics industry, for clay coatings for paper, and the like. The copolymer can be employed as such, i.e., in the anhydride form, and hydrolysis to the free acid or salt, if salt-forming materials are present, occurs in the aqueous medium in which the polymer is being used. Alternatively, the copolymer before use can first be converted to the free acid form by hydrolysis, or to the form of its alkali metal or other metal salts, ammonium salts, amine salts, partial or complete ester or amide, and the like, as may be desired for any particular purpose.

The following examples are provided to give an indication of suitable reactants, solvents, alkylated aromatic hydrocarbons, catalysts, and proportions of same, as well as suitable temperature and pressure conditions for the copolymerization. However, it will be understood that variations from these specific examples can be made without departing from the invention.

EXAMPLES

A three-liter rocking autoclave was charged with maleic anhydride plus the particular organic liquid or liquids indicated for the controls and examples in the subjoined table, in the indicated amounts. Also charged to the bomb was benzoyl peroxide catalyst in the amount indicated in the table. The autoclave bomb was pressured to 100 pounds per square inch gauge (p.s.i.g.) with ethylene, rocked at room temperature for ten minutes, and the ethylene vented. This was repeated one or two times. By this flushing procedure the reaction mixture was freed of any dissolved air. The bomb was then charged with sufficient ethylene to give an estimated 200 p.s.i.g. pressure on heating to the chosen reaction temperature of 70° C. or 80° C.

Rocking of the bomb was started, and the contents brought up to reaction temperatures by means of an electrically heated jacket. Additional ethylene was charged into the bomb from time to time to maintain the chosen pressure of 200 p.s.i.g.. In each instance the run continued overnight so the total time was 16 to 24 hours; however, the copolymerization reaction was completed in from 10 to 20 hours, varying from example to example.

Unreacted ethylene was vented, the total reaction mixture was filtered, the separated ethylene/maleic anhydride copolymer was washed several times with benzene or ethylene dichloride while filtering, and the polymer was then dried at 100° C. for 24 hours under the full vacuum of a water aspirator. Yield was calculated as percent of theory, based on 100 percent of the maleic anhydride being copolymerized with ethylene in 1:1 mole ratio.

The specific viscosity of the polymer product was determined by modification of ASTM Method D-445-46-T, Method B, using an Ostwald type viscosimeter. The polymer was dissolved in 1 weight per cent concentration in dimethylformamide, and the specific viscosity determined at 25° C.

Comparison of the examples with the controls reveals immediately the very powerful effect, on molecular weight of the copolymer product, of substituting even comparatively small proportions of the alkylbenzenes for the benzene or ethylene dichloride solvent. Thus, comparing Examples 1 and 2 on the one hand with control A on the other hand, substituting 31 volume percent of the benzene with diisopropylbenzene yielded a copolymer having a specific viscosity of 0.06, as compared with 0.23 obtained in the control run. Comparison of the same runs shows that the diisopropylbenzene markedly reduced the yield of the copolymer, but that this was brought back to a good value by increasing the catalyst concentration to 1 mole percent. Comparison of Example 3 with Examples 1 and 2 shows that low molecular weight product is also obtained on substitution of ethylene dichloride for benzene.

The products obtained in Examples 1, 2 and 3 were somewhat glazed and not of the best physical properties. This was due largely to the very low molecular weight of the product, and also to the temperature of 80° C. The product of Example 1 was of somewhat poorer quality than that of Examples 2 and 3 because the low yield caused the polymer product to be contaminated more highly with unreacted maleic anhydride. However, if the same runs are made using diisoproylbenzene alone, the adverse characteristics are even more accentuated, possibly due at least partly to the lower solvent capacity of diisopropylbenzene for maleic anhydride. Lowering of the temperature, as in Examples 4, 5 and 6, reduced the glazed and agglomerated nature of the copolymer.

The concentration of diisopropylbenzene in Examples 4 and 5 was reduced to 12.5 volume percent, based on diisopropylbenzene plus benzene. Despite this, low molecular weight products, having specific viscosities of 0.12 and 0.10, respectively, were still obtained. Similar results were obtained in Example 6 using para-cymene in place of diisopropylbenzene and in somewhat higher concentration. The physical form of the products of Examples 4, 5 and 6 was superior to that of the products of Examples 1, 2 and 3, and much superior to that obtainable under the same conditions but substituting the alkylbenzene for all of the benzene.

All of the ethylene/maleic anhydride copolymers of Examples 1–6 are excellent thinners and deflocculants for aqueous base oil well drilling muds when added thereto at the rate of from 1 to 4 pounds of copolymer per 42-gallon barrel of mud.

While the invention has been described with particular reference to various preferred embodiments thereof, it will be appreciated that numerous modifications and variations are possible without departing from the invention in its broadest aspects.

Table

| Example | Maleic anhydride, grams | Liquids | | | | Benzoyl Peroxide, Mole percent | Temp., ° C. | EMA Copolymer | |
|---|---|---|---|---|---|---|---|---|---|
| | | Solvent, ml. | Alkyl Aromatic, ml. | Vol. per cent of Liquids | Mole percent [1] | | | Yield percent | Specific Viscosity |
| Control A | 267 | Benzene, 2089 | 0 | 0 | 0 | 0.5 | 80 | 96.8 | 0.23 |
| Control B | 200 | Benzene, 1600 | 0 | 0 | 0 | 0.5 | 70 | 99.3 | 0.36 |
| Control C | 267 | Ethylene dichloride, 2089 | 0 | 0 | 0 | 0.5 | 80 | 97.2 | 0.16 |
| 1 | 200 | Benzene, 1100 | Diisopropylbenzene, 500 | 31 | 65.0 | 0.5 | 80 | 37.0 | 0.06 |
| 2 | 267 | Benzene, 1436 | Diisopropylbenzene, 653 | 31 | 63.6 | 1.0 | 80 | 86.8 | 0.06 |
| 3 | 200 | Ethylene dichloride, 1100 | Diisopropylbenzene, 500 | 31 | 65.0 | 1.0 | 80 | 85.6 | 0.08 |
| 4 | 200 | Benzene, 1400 | Diisopropylbenzene, 200 | 12.5 | 26.0 | 0.5 | 70 | 79.8 | 0.12 |
| 5 | 200 | do | do | 12.5 | 26.0 | 1.0 | 70 | 94.2 | 0.10 |
| 6 | 200 | Benzene, 1288 | p-Cymene, 312 | 19.5 | 50.2 | 0.5 | 70 | 55.6 | 0.10 |

[1] Based on reacting monomers.

I claim:

1. In the copolymerization of maleic anhydride with an olefin having from 2 to 4 carbon atoms in the presence of a free radical promoting catalyst to form an olefin/maleic anhydride copolymer, the improvement which comprises effecting said copolymerization at 40 to 80° C. in the presence of sufficient inert liquid solvent for maleic anhydride selected from the group consisting of benzene, halobenzenes, and haloparaffins to dissolve all the maleic anhydride, plus at least 10 mole percent based upon the reacting monomers of an alkylated aromatic hydrocarbon having at least one hydrogen atom alpha to an aromatic ring and containing from 8 to 15 carbon atoms.

2. In the copolymerization of maleic anhydride with ethylene in the presence of a free radical promoting catalyst to form ethylene/maleic anhydride copolymer, the improvement which comprises effecting said copolymerization at 40 to 80° C. in the presence of sufficient inert liquid solvent for maleic anhydride selected from the group consisting of benzene, halobenzenes, and haloparaffins to dissolve all the maleic anhydride, plus at least 10 mole percent based upon the reacting monomers of an alkylated aromatic hydrocarbon having at least one hydrogen atom alpha to an aromatic ring and containing from 8 to 15 carbon atoms.

3. In the copolymerization of maleic anhydride with propylene in the presence of a free radical promoting catalyst to form propylene/maleic anhydride copolymer, the improvement which comprises effecting said copolymerization at 40 to 80° C. in the presence of sufficient inert liquid solvent for maleic anhydride selected from the group consisting of benzene, halobenzenes, and haloparaffins to dissolve all the maleic anhydride, plus at least 10 mole percent based upon the reacting monomers of an alkylated aromatic hydrocarbon having at least one hydrogen atom alpha to an aromatic ring and containing from 8 to 15 carbon atoms.

4. In the copolymerization of maleic anhydride with isobutylene in the presence of a free radical promoting catalyst to form isobutylene/maleic anhydride copolymer, the improvement which comprises effecting said copolymerization at 40 to 80° C. in the presence of sufficient inert liquid solvent for maleic anhydride selected from the group consisting of benzene, halobenzenes, and haloparaffins to dissolve all the maleic anhydrides, plus at least 10 mole percent based upon the reacting monomers of an alkylated aromatic hydrocarbon having at least one hydrogen atom alpha to an aromatic ring and containing from 8 to 15 carbon atoms.

5. In the copolymerization of maleic anhydride with an olefin having from 2 to 4 carbon atoms in the presence of a free radical promoting catalyst to form an olefin/maleic anhydride copolymer, the improvement which comprises effecting said copolymerization at 40 to 80° C. in the presence of sufficient inert liquid capable of dissolving at least 10 weight percent maleic anhydride at 60° C. and selected from the group consisting of benzene, halobenzenes, and haloparaffins to dissolve all the maleic anhydride, plus at least 10 mole percent based upon the reacting monomers of an alkylated aromatic hydrocarbon having at least one hydrogen atom alpha to an aromatic ring and containing from 8 to 15 carbon atoms.

6. In the copolymerization of maleic anhydride with ethylene in the presence of a free radical promoting catalyst to form ethylene/maleic anhydride copolymer, the improvement which comprises effecting said copolymerization at 40 to 80° C. in the presence of sufficient inert liquid capable of dissolving at least 10 weight percent maleic anhydride at 60° C. and selected from the group consisting of benzene, halobenzenes, and haloparaffins to dissolve all the maleic anhydride, plus at least 10 mole percent based upon the reacting monomers of an alkylated aromatic hydrocarbon having at least one hydrogen atom alpha to an aromatic ring and containing from 8 to 15 carbon atoms.

7. In the copolymerization of ethylene with maleic anhydride in the presence of a free radical promoting catalyst to form an ethylene/maleic anhydride copolymer, the improvement which comprises effecting said copolymerization at 40 to 80° C. in the presence of a mixture of sufficient benzene to dissolve all the maleic anhydride and at least 10 mole percent based upon the reacting monomers of an isopropylated benzene.

8. In the copolymerization of ethylene with maleic anhydride in the presence of a free radical promoting catalyst to form an ethylene/maleic anhydride copolymer, the improvement which comprises effecting said copolymerization at 40 to 80° C. in the presence of a mixture of sufficient benzene to dissolve all the maleic anhydride and at least 10 mole percent based upon the reacting monomers of diisopropylbenzene.

9. In the copolymerization of ethylene with maleic anhydride in the presence of a free radical promoting catalyst to form an ethylene/maleic anhydride copolymer, the improvement which comprises effecting said copolymerization at 40 to 80° C. in the presence of a mixture of sufficient ethylene dichloride to dissolve all the maleic anhydride and at least 10 mole percent based upon the reacting monomers of diisopropylbenzene.

10. In the copolymerization of ethylene with maleic anhydride in the presence of a free radical promoting catalyst to form an ethylene/maleic anhydride copolymer, the improvement which comprises effecting said copolymerization at 40 to 80° C. in the presence of a mixture of sufficient benzene to dissolve all the maleic anhydride and at least 10 mole percent based upon the reacting monomers of p-cymene.

11. A process according to claim 1 in which said inert liquid solvent for maleic anhydride is benzene.

12. A process according to claim 5 in which said inert liquid is benzene and said alkylated aromatic hydrocarbon is an alkylbenzene.

13. A process which comprises subjecting maleic anhydride completely dissolved in benzene and maintained under an ethylene pressure of at least 200 pounds per square inch and at a temperature within the range of 40 to 80° C. to polymerization with the aid of a peroxide catalyst present in an amount of at least 1 mole percent based on the reacting monomers plus an alkylbenzene having at least one hydrogen atom alpha to the benzene ring and containing from 8 to 15 carbon atoms and present in an amount of at least 25 mole percent based on the reacting monomers, continuing said polymerization conditions until a high proportion of the maleic anhydride has been copolymerized with ethylene, and recovering as a product of the process an ethylene/maleic anhydride copolymer in high yield and having a specific viscosity as determined in 1 weight percent solution in dimethylformamide at 25° C. of not in excess of 0.1.

14. A process according to claim 13 in which said peroxide is benzoyl peroxide.

15. A process according to claim 13 in which said alkylbenzene is diisopropylbenzene.

16. A process which comprises subjecting maleic anhydride completely dissolved in ethylene dichloride and maintained under an ethylene pressure of at least 200 pounds per square inch and at a temperature within the range of 40 to 80° C. to polymerization with the aid of a peroxide catalyst present in an amount of at least 1 mole percent based on the reacting monomers plus an alkylbenzene having at least one hydrogen atom alpha to the benzene ring and containing from 8 to 15 carbon atoms and present in an amount of at least 25 mole percent based on the reacting monomers, continuing said polymerization conditions until a high proportion of the maleic anhydride has been copolymerized with ethylene, and recovering as a product of the process an ethylene/maleic anhydride copolymer in high yield and having a specific viscosity as determined in 1 weight percent solution in dimethylformamide at 25° C. of not in excess of 0.1.

17. A process which comprises subjecting maleic anhydride completely dissolved in ethylene dichloride and maintained under an ethylene pressure of at least 200 pounds per square inch and at a temperature within the range of 40 to 80° C. to polymerization with the aid of a peroxide catalyst present in an amount of at least 1 mole percent based on the reacting monomers plus diisopropylbenzene present in an amount of at least 25 mole percent based on the reacting monomers, continuing said polymerization conditions until a high proportion of the maleic anhydride has been copolymerized with ethylene, and recovering as a product of the process an ethylene/maleic anhydride copolymer in high yield and having a specific viscosity as determined in 1 weight percent solution in dimethylformamide at 25° C. of not in excess of 0.1.

References Cited in the file of this patent

UNITED STATES PATENTS

| | | |
|---|---|---|
| 2,396,785 | Hanford | Mar. 19, 1946 |
| 2,675,370 | Barrett | Apr. 13, 1954 |

OTHER REFERENCES

Schildknecht: "Vinyl and Related Polymers," Wiley & Sons (1952), pages 14, 15, 504, 505. (Copy in Sci. Libr.)